June 17, 1969 F. J. L. TURNER ET AL 3,450,321

APPARATUS FOR HANDLING SPROCKET-FED CARDS AND THE LIKE

Filed April 21, 1967 Sheet 1 of 2

United States Patent Office 3,450,321
Patented June 17, 1969

3,450,321
APPARATUS FOR HANDLING SPROCKET-FED CARDS AND THE LIKE

Frederick James Leslie Turner, Arthur John Compton Soper, and Harold Louis Morel, Hollingbury, Brighton, England, assignors to Creed & Company Limited, Hollingbury, England, a British company Filed Apr. 21, 1967, Ser. No. 632,711
Claims priority, application Great Britain, May 3, 1966, 19,419/66
Int. Cl. G03b *1/22*
U.S. Cl. 226—67 4 Claims

ABSTRACT OF THE DISCLOSURE

Sprocket-fed cards are automatically fed into a card reader by means which "inch" an inserted card onto a set of spring-loaded feeder pins. The insertion of the card automatically starts the mechanism. The arrangement can be modified to allow tape to be fed to the reader over the outside of the automatic loader.

This invention relates to apparatus for handling sprocket-fed cards and the like of the kind in which a card is arranged to be advanced step-by-step past a reading station by stepping means including one or more projections adapted to enter feed holes in a card.

Hitherto, in order to avoid damage to the card by faulty registration with the projections, it has been customary for each card to be inserted in the apparatus by a time-consuming set of operations which includes opening a card gate and manually locating the card so that it is correctly registered with the projections.

The object of the invention is to speed up the insertion of cards and for this purpose apparatus of the kind already referred to is provided with automatic loading means for advancing an inserted card in a series of small increments of a step until the feed holes can be entered by one or more of said projections, said projections being permissive in order to prevent their damaging a card before they can enter the perforations therein.

Figure 1:
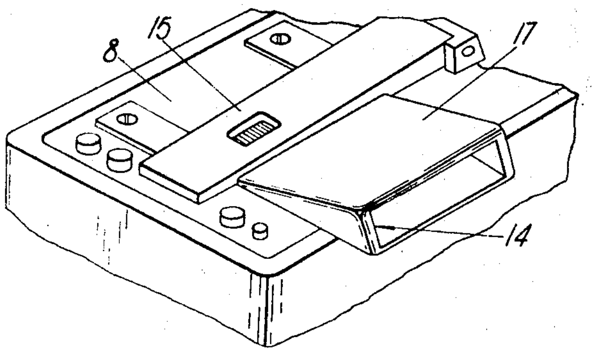
Figure 2:
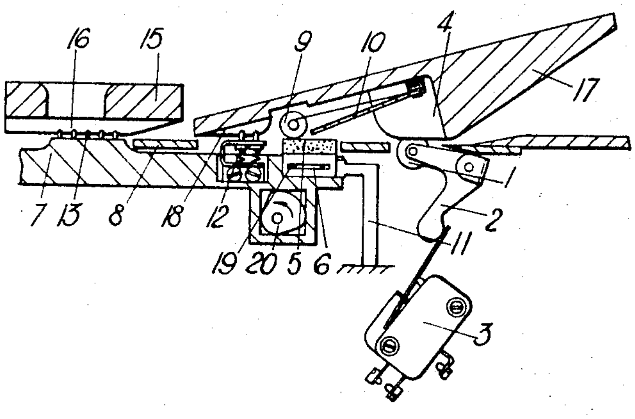
Figure 3:
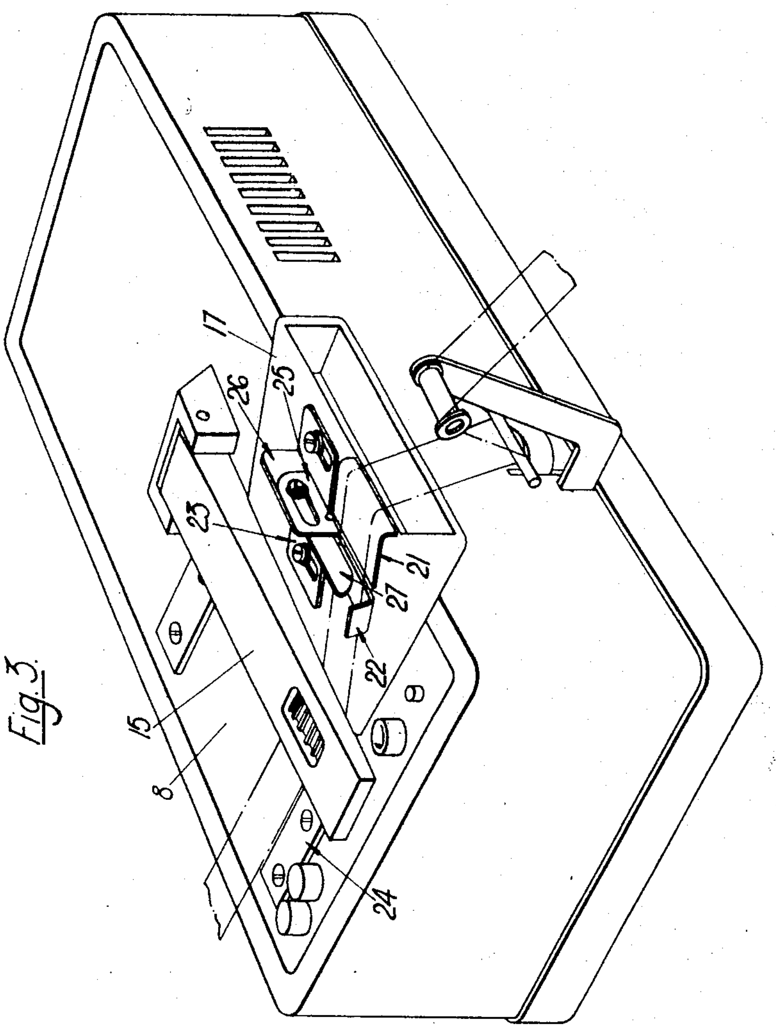

An embodiment of the invention together with a modification thereof will now be described by way of example with reference to the accompanying drawings, in which:

FIG. 1 is a perspective view of the top of sprocket-fed card handling apparatus fitted with automatic loading means, FIG. 2 is an enlarged cross section of the automatic loading means, and FIG. 3 shows how the apparatus according to this embodiment could be modified to permit the handling of sprocket-fed tape.

It is to be understood that the term "sprocket-fed" card (or tape) is intended to cover any card (or tape) bearing information in any retrievable form and provided with regular perforations along its length for engagement by stepping means having one or more projections adapted to enter such perforations.

Cards to be automatically loaded are inserted into a moulded chute 17 attached to the reader top plate 8. The chute has a tapered aperture which guides the cards over a roller 1 attached to a bell crank lever 2 which operates the "Card-in" microswitch 3. To ensure that the card depresses the lever, two guide fins 4 are provided, one each side of the roller, to prevent the card rising.

Slightly further down the throat of the aperture is a friction pad 5 on a sliding bracket 6 attached to one end of a feed rake 7, the pad protruding through a slot in the top plate 8. The "parallellogram" locus of motion of the feed rake is derived from a cam 20. An inserted card is held against the friction pad 5 by means of a spring-loaded roller 9, and a deflector plate 10 is provided to guide the card under the roller. Travel of the sliding bracket 6 is limited to less than a single feed pitch by a stop 11.

In front of the sliding bracket 6 and rigidly attached to the feed rake 7 are two permissive (in this case spring-loaded) auxiliary feed pins 12 (one feed pitch apart) and located a whole number of feed pitches from the main feed rake pins 13. Another two guide fins 18, one each side of the pins 12, are provided to prevent the card rising.

To accommodate slight variations in card widths, the width of the chute is made slightly greater than that of a normal card and inserted cards are biased against a reference edge 14 by a light spring (not shown).

A gate 15 is provided for the removal of damaged cards, and the leading edges of the card gate tines 16 are tapered to guide the card past the reading station.

*Sequence of operation*

As a card is inserted into the tapered aperture of the chute 17, it is guided so as to depress the roller attached to the bell crank lever 2. The lever actuates the "Card-in" microswitch 3 used to trigger external switching circuits which are arranged to start the reader motor and initiate the feed by energising the reader trip magnet and engaging the clutch.

At the beginning of each cycle the sliding bracket 6 is against the stop 11 to limit the travel of the bracket and friction pad 5 to less than 0.1 inch, i.e. a small increment of a total step.

As the main rake 7 is raised and fed forward (i.e. to the left in FIG. 2), the card is pinched between the friction pad 5 and roller 9. The rake moves forward until a pin 19, rigidly attached to the rake, reaches the end of the slot in the sliding bracket 6 and the card is thus transported towards the spring-loaded pins 12 by less than 0.1 inch each cycle.

At the end of the cycle the rake is lowered and moves to the right, the travel of the sliding bracket to the right being restrained by the stop 11 to limit the friction pad travel to less than 0.1 inch.

While the rake and friction pad are lowered and being moved to the right, the card is lightly held by the spring-loaded roller 1 against the guide fins 4.

The rake is then raised and if the pins 12 and the feed holes in the card are not in register, the pins are depressed and held down by the card. The short travel between the pin 19 and the left-hand end of the slot in bracket 6 is then taken up and the pins sweep the underside of the card, searching for the feed holes. If the pins do not engage the feed holes during the first cycle, registration is soon established since the friction pad feeds the card by an increment which is less than a full pitch each cycle.

Once the pins 12 have entered the feed holes the card is fed forward a full pitch each cycle. The main feed rake pins 13 and the feed holes in the card are now correctly phased and the pins will enter the feed holes cleanly and with a minimum of damage.

It may be desired to use the same reader for either sprocket-fed cards or tape and in order to permit this, the apparatus described with reference to FIGS. 1 and 2 may be modified as shown in FIG. 3.

The top surface of the card loading chute 17 already forms an inclined plane, the lower end of which meets the top plate 8 of the reader adjacent to the reading station. Tape is loaded in a conventional manner by lifting the gate 15 at the reading station and manually locating the tape on the feed rake teeth 13. The tape is routed to the reading station along the top surface of the chute 17 to which a tape guide assembly and runner plate are attached as will now be described.

The tape approaches the reader via a conventional assembly comprising a roller and tape-tight contact-arm, and then slides on a runner plate 2, provided to protect the edge of the moulded chute 17. A guide bracket 22, which is a part of an adjustably-mounted plate 23, is aligned with a guide plate 24 fixed to the top plate 8 of the reader and porvides correct registration with the feed rake for the guide edge of the tape. The guide edge of the tape is kept in abutment with the guide 22 by a member 25 which guides the other edge of the tape. The member 25 is adjustably mounted on an upright potrion 26 of the plate 23, to accommodate tapes of different widths. The remaining member of the guide assembly is a keeper blade 27, which holds the tape flat between the guides 22 and 25.

What we claim is:

1. Apparatus for handling sprocket-fed cards and the like in which a card is arranged to be advanced step-by-step past a reading station by stepping means including one or more projections adapted to enter feed holes in a card, characterized by the provision of automatic loading means for advancing an inserted card in a series of small increments of a step until the feed holes can be entered by one or more of said projections, said projections being permissive in order to prevent their damaging a card before they can enter the perforations therein.

2. Apparatus for handling sprocket-fed cards and the like of the kind in which a card is arranged to be advanced step-by-step past a reading station by stepping means including one or more main projections adapted to enter feed holes in a card, characterized by the provision of automatic loading means for advancing an inserted card in a series of small increments of a step until the feed holes can be entered by one or more auxiliary projections movable with the main projections and spaced therefrom by the pitch of the feed holes or a multiple thereof.

3. Apparatus as claimed in claim 2 in which the automatic loading means comprises a friction pad movable by the stepping means but restrained from making a large increments of movement, the pad being arranged to contact and advance the card once in every cycle of the stepping means.

4. Apparatus as claimed in claim 3 comprising a spring-loaded member arranged to be moved by an inserted card to close a switch to start the stepping mechanism, the member being also adapted to retain the card in position between the small increments of stepping.

References Cited

UNITED STATES PATENTS

| | | | |
|---|---|---|---|
| 2,772,325 | 11/1956 | Gaite | 226—57 X |
| 3,261,602 | 7/1966 | Waldenburger | 271—51 |
| 3,303,981 | 2/1967 | Wiese | 226—115 |

ALLEN N. KNOWLES, *Primary Examiner.*

U.S. Cl. X.R.

226—92, 116; 271—54